(12) United States Patent
Sano et al.

(10) Patent No.: US 8,114,543 B2
(45) Date of Patent: Feb. 14, 2012

(54) LITHIUM ION SECONDARY BATTERY

(75) Inventors: Atsushi Sano, Tokyo (JP); Tsuyoshi Iijima, Tokyo (JP)

(73) Assignee: TDK Corporation, Tokyo (JP)

(*) Notice: Subject to any disclaimer, the term of this patent is extended or adjusted under 35 U.S.C. 154(b) by 1099 days.

(21) Appl. No.: 11/636,581

(22) Filed: Dec. 11, 2006

(65) Prior Publication Data

US 2007/0134556 A1 Jun. 14, 2007

(30) Foreign Application Priority Data

Dec. 12, 2005 (JP) ............................ P2005-358062
Nov. 30, 2006 (JP) ............................ P2006-324559

(51) Int. Cl.
*H01M 4/13* (2010.01)
*H01M 6/48* (2006.01)
*H01M 10/18* (2006.01)
*H01M 4/58* (2010.01)
*H01M 4/64* (2006.01)
*H01M 4/72* (2006.01)
*H01M 2/16* (2006.01)

(52) U.S. Cl. ............... 429/233; 429/210; 429/231.95; 429/247

(58) Field of Classification Search ............. 429/210, 429/231.95, 233, 247
See application file for complete search history.

(56) References Cited

U.S. PATENT DOCUMENTS

| 2003/0091892 A1* | 5/2003 | Watanabe et al. ............ 429/62 |
| 2004/0142245 A1 | 7/2004 | Ishikawa et al. |
| 2005/0100784 A1 | 5/2005 | Yageta et al. |

FOREIGN PATENT DOCUMENTS

| JP | A 11-181134 | 7/1999 |
| JP | A 2000-173659 | 6/2000 |
| JP | A 2003-257496 | 9/2003 |
| JP | A-2004-006164 | 1/2004 |
| JP | A-2004-087209 | 3/2004 |
| JP | A-2004-362809 | 12/2004 |
| JP | A-2005-142028 | 6/2005 |
| WO | WO 03/063269 A1 | 7/2003 |

* cited by examiner

*Primary Examiner* — Gregg Cantelmo
*Assistant Examiner* — Eugenia Wang
(74) *Attorney, Agent, or Firm* — Oliff & Berridge, PLC (57) ABSTRACT

A lithium ion secondary battery, having a positive electrode, a negative electrode, and a separator provided between the positive electrode and the negative electrode, the positive electrode and the negative electrode each having a collector and an active material layer provided over the collector, and the relationship $Ts \geq 4Tc$ being satisfied, where Ts is the puncture strength of the separator, and Tc is the puncture strength of the collector of the positive electrode and/or the negative electrode.

5 Claims, 9 Drawing Sheets

| | POSITIVE ELECTRODE COLLECTOR | | | SEPARATOR | | | | NEGATIVE ELECTRODE COLLECTOR | | | PUNCTURE TEST RESULTS | |
|---|---|---|---|---|---|---|---|---|---|---|---|---|
| | TYPE | THICKNESS (μm) | PUNCTURE STRENGTH (kgf) | PUNCTURE STRENGTH (N) | TYPE | THICKNESS (μm) | PUNCTURE STRENGTH (kgf) | PUNCTURE STRENGTH (N) | TYPE | THICKNESS (μm) | PUNCTURE STRENGTH (kgf) | PUNCTURE STRENGTH (N) | VOLTAGE IMMEDIATELY AFTER PUNCTURE (V) | MAX. ATTAINED TEMP (°C) |
| EX. 1 | PLAIN Al FOIL | 10 | 0.022 | 0.22 | 1 LAYER PE | 12 | 0.13 | 1.27 | PLAIN Cu FOIL | 17 | 0.16 | 1.57 | 3.8 | 35 |
| EX. 2 | PLAIN Al FOIL | 10 | 0.022 | 0.22 | 1 LAYER PE | 18 | 0.17 | 1.67 | PLAIN Cu FOIL | 17 | 0.16 | 1.57 | 3.9 | 30 |
| EX. 3 | PLAIN Al FOIL | 10 | 0.022 | 0.22 | 2 LAYERS PE | 25 | 0.24 | 2.35 | PLAIN Cu FOIL | 17 | 0.16 | 1.57 | 3.9 | 31 |
| EX. 4 | PLAIN Al FOIL | 10 | 0.022 | 0.22 | 1 LAYER PE | 27 | 0.27 | 2.65 | PLAIN Cu FOIL | 17 | 0.16 | 1.57 | 3.9 | 24 |
| EX. 5 | PLAIN Al FOIL | 10 | 0.022 | 0.22 | 1 LAYER PE | 27 | 0.3 | 2.94 | PLAIN Cu FOIL | 17 | 0.16 | 1.57 | 3.9 | 30 |
| EX. 6 | PLAIN Al FOIL | 17 | 0.060 | 0.59 | 1 LAYER PE | 27 | 0.27 | 2.65 | PLAIN Cu FOIL | 17 | 0.16 | 1.57 | 3.8 | 36 |
| EX. 7 | PLAIN Al FOIL | 12 | 0.030 | 0.29 | 1 LAYER PE | 16 | 0.14 | 1.37 | PLAIN Cu FOIL | 17 | 0.16 | 1.57 | 3.8 | 35 |
| EX. 8 | PLAIN Al FOIL | 12 | 0.030 | 0.29 | 1 LAYER PE | 16 | 0.18 | 1.76 | PLAIN Cu FOIL | 17 | 0.16 | 1.57 | 3.8 | 33 |
| EX. 9 | PLAIN Al FOIL | 12 | 0.030 | 0.29 | 1 LAYER PE | 20 | 0.2 | 1.96 | PLAIN Cu FOIL | 17 | 0.16 | 1.57 | 3.9 | 29 |
| EX. 10 | PLAIN Al FOIL | 12 | 0.030 | 0.29 | 1 LAYER PE | 16 | 0.22 | 2.16 | PLAIN Cu FOIL | 17 | 0.16 | 1.57 | 4 | 28 |
| COMP. EX. 1 | PLAIN Al FOIL | 10 | 0.022 | 0.22 | 2 LAYERS PE | 18 | 0.07 | 0.69 | PLAIN Cu FOIL | 17 | 0.16 | 1.57 | 3.6 | 50 |
| COMP. EX. 2 | PLAIN Al FOIL | 20 | 0.083 | 0.81 | 2 LAYERS PE | 18 | 0.07 | 0.69 | PLAIN Cu FOIL | 17 | 0.16 | 1.57 | 0.9 | 70 |
| COMP. EX. 3 | ETCHED Al FOIL | 40 | 0.170 | 1.67 | 2 LAYERS PE | 18 | 0.07 | 0.69 | PLAIN Cu FOIL | 17 | 0.16 | 1.57 | 0.9 | 65 |
| COMP. EX. 4 | PLAIN Al FOIL | 20 | 0.083 | 0.81 | 2 LAYERS PE | 25 | 0.24 | 2.35 | PLAIN Cu FOIL | 17 | 0.16 | 1.57 | 3.0 | 54 |
| COMP. EX. 5 | ETCHED Al FOIL | 40 | 0.170 | 1.67 | 2 LAYERS PE | 25 | 0.24 | 2.35 | PLAIN Cu FOIL | 17 | 0.16 | 1.57 | 3.2 | 49 |
| COMP. EX. 6 | PLAIN Al FOIL | 17 | 0.060 | 0.59 | 1 LAYER PE | 20 | 0.2 | 1.96 | PLAIN Cu FOIL | 17 | 0.16 | 1.57 | 3.5 | 50 |
| COMP. EX. 7 | PLAIN Al FOIL | 12 | 0.030 | 0.29 | 1 LAYER PE | 9 | 0.1 | 0.98 | PLAIN Cu FOIL | 17 | 0.16 | 1.57 | 3.6 | 48 |

Fig.9

LITHIUM ION SECONDARY BATTERY

BACKGROUND OF THE INVENTION

1. Field of the Invention

The present invention relates to a lithium ion secondary battery.

2. Related Background Art

Lithium ion secondary batteries having a pair of electrodes and a separator provided in between the electrodes have been known in the past. Each electrode has a collector and an active material layer provided over the collector.

With these lithium ion secondary batteries, the heat generated when a puncture test is conducted needs to be kept sufficiently low.

Attempts at suppressing heat generation have included providing a back coating layer to the outside of the battery, as in Japanese Laid-Open Patent Application 2003-257496, or increasing the strength of the separator, as in Japanese Laid-Open Patent Applications 2000-173659 and H11-181134, for example.

SUMMARY OF THE INVENTION

However, with conventional lithium ion secondary batteries, it was sometimes impossible to sufficiently suppress heat generation when the lithium ion secondary battery was subjected to a puncture test.

The present invention was conceived in light of the above problem, and it is an object thereof to provide a lithium ion secondary battery with which heat generation during a puncture test can be sufficiently suppressed.

As a result of diligent research, the inventors arrived at the present invention upon discovering that heat generation can be sufficiently suppressed in a puncture test by increasing the puncture strength Ts of a separator to more than four times the puncture strength Tc of the collector of either of the electrodes.

The lithium ion secondary battery pertaining to the present invention comprises a positive electrode, a negative electrode, and a separator provided between the positive and negative electrodes. The positive and negative electrodes each have a collector and an active material layer provided over the collector. Also, the relationship $Ts \geq 4Tc$ is satisfied, where Ts is the puncture strength of the separator, and Tc is the puncture strength of the collector of the positive electrode and/or the negative electrode.

The "puncture strength" referred to here is the maximum load when a needle punctures the test piece at a rate of 200 mm/min, using a needle in which a conical portion with a height of 2.6 mm is formed at the tip of a shaft with a diameter of 3 mm, and the radius of curvature of the tip of this conical portion is 40 µm.

With a lithium ion secondary battery constituted in this way, heat generation is sufficiently suppressed when a puncture test is conducted. Therefore, the lithium ion secondary battery is even safer.

The reason the lithium ion secondary battery of the present invention exhibits these characteristics is not entirely clear, but the following mechanism is a possibility. First, when a needle passes through a laminate with a structure of negative electode/separator/positive electrode, one possible source of heat generation in this puncture test is that the collector of one of the electrodes becomes wrapped around the needle around the hole, protrudes through the hole in the separator, and comes into contact with the collector of the adjacent electrode. With the present invention, however, because the puncture strength of the separator is at least four times higher than the puncture strength of the collector of the positive electrode and/or the negative electrode, it is believed that when the needle is stuck through the laminate, the separator stretches out better than the collector of said one electrode, and this separator tends to overlap the adjacent separator, whereas the collector of said one electrode tends to break and not to stretch, so it is blocked by the separator and tends not to come into contact with the collector of the adjacent electrode.

It is preferable here is $Tc \leq 0.5$ N and $Ts \geq 1.5$ N. Satisfying these conditions further suppresses heat generation during a puncture test.

It is also preferable if the collector of the positive electrode and/or the negative electrode is an aluminum foil. Because aluminum foil has a tendency to stretch easily, it is believed that stretching will be suppressed and heat generation during a puncture test will be sufficiently suppressed if the above requirements are satisfied.

It is also preferable if the lithium ion secondary battery has a laminated structure of negative electrode/separator/(positive electrode/separator/negative electrode)$_n$ (where n is a repeat number, and is an integer of at least 1). In this case heat generation during a puncture test will be further suppressed.

It is also preferable if, in the case of a laminated structure such as this, each of the negative electrodes has the active material layer on both sides of the collector. In this case, the negative electrodes, and particularly the negative electrode on the outermost layer, will be resistant to warping even after repeated charge and discharge cycling. Also, since only one type of negative electrode will be needed (a negative electrode comprising an active material layer formed on both sides of a collector), that is, since a negative electrode comprising an active material layer formed on just one side of a collector need not be produced for the outermost layer, the manufacturing cost will be lower.

The present invention provides a lithium ion secondary battery with which heat generation during puncture can be sufficiently suppressed.

BRIEF DESCRIPTION OF THE DRAWINGS

FIG. 8 is a table of the conditions and results in Working Examples 1 to 10 and Comparative Examples 1 to 7.

DESCRIPTION OF THE PREFERRED EMBODIMENTS

First Embodiment

First, an embodiment of the lithium ion secondary battery of the present invention will be described in detail.

Figure 1:
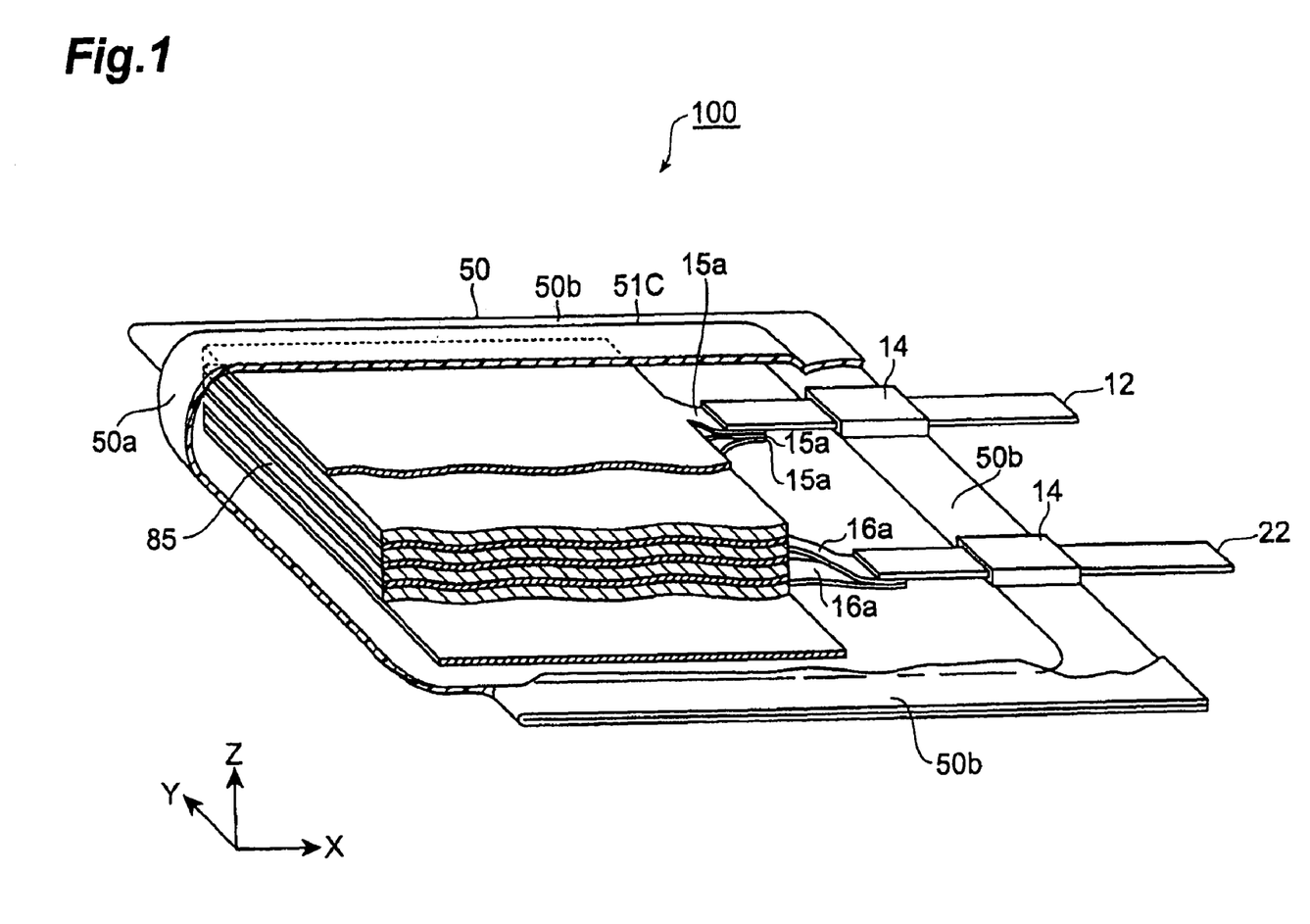
FIG. 1 is a partially cut-away, simplified perspective view of the lithium ion secondary battery pertaining to an embodiment.
Figure 2:
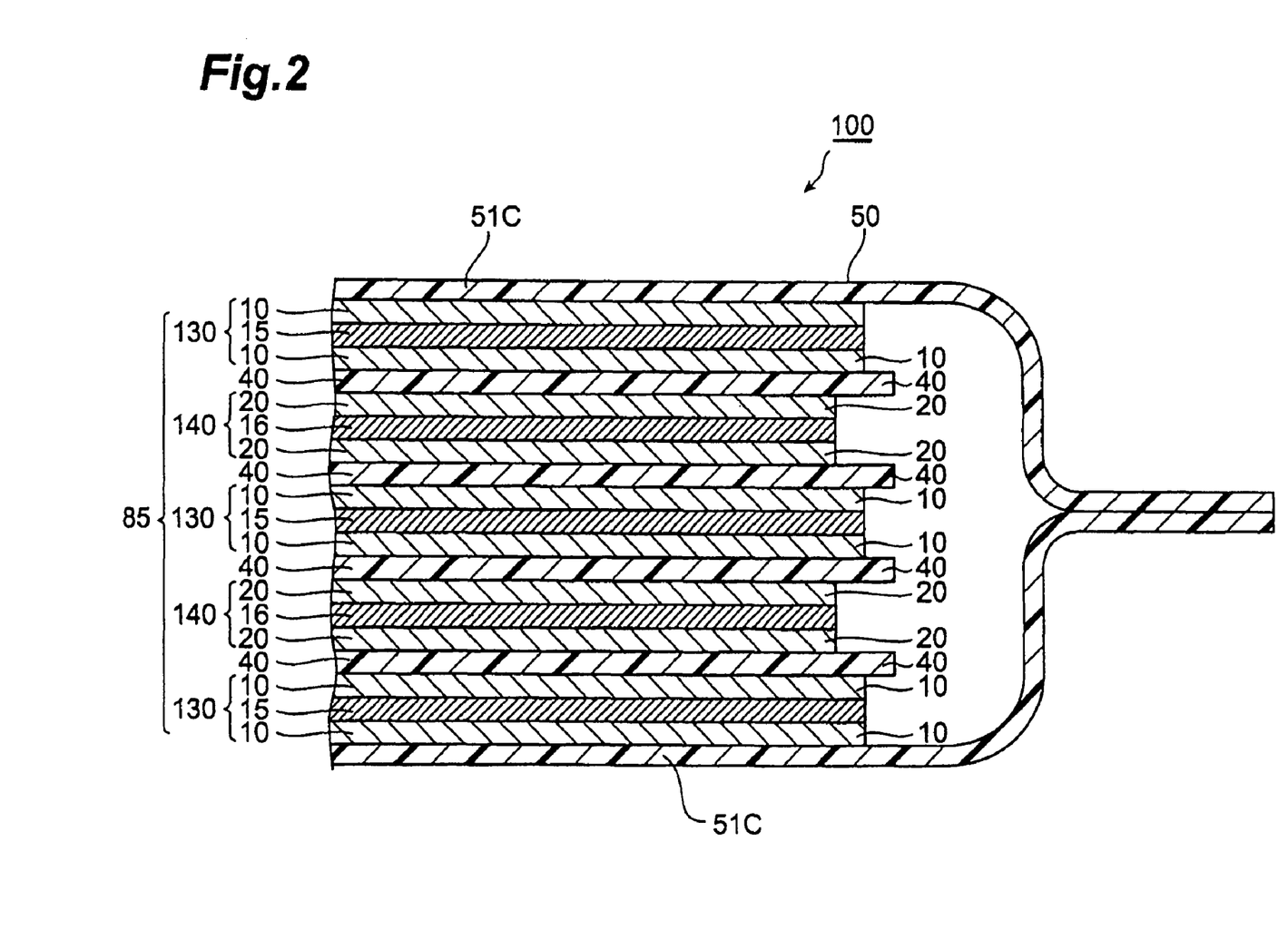
FIG. 2 is a simplified cross section along the YZ plane of the lithium ion secondary battery in FIG. 1.
Figure 3:
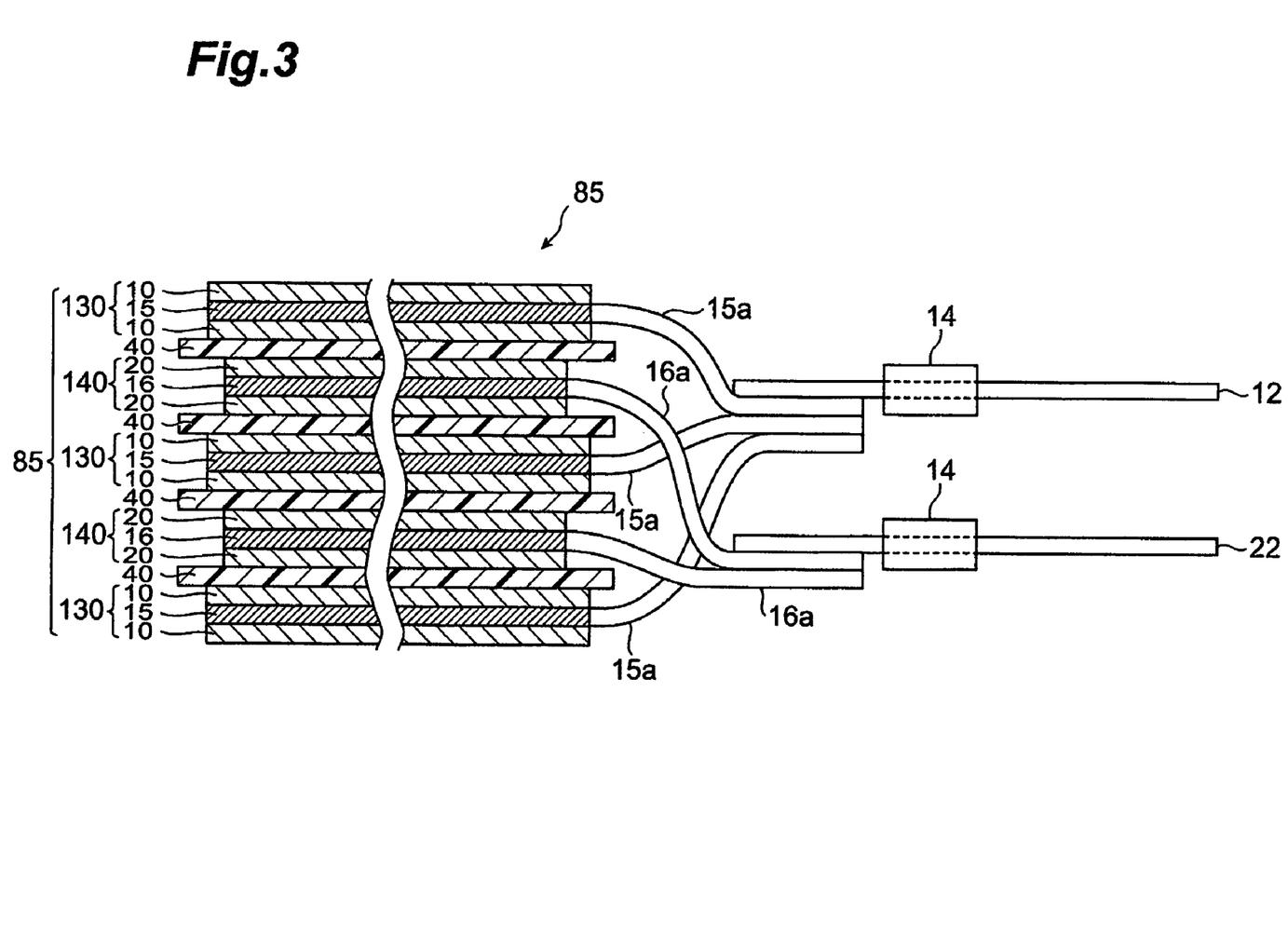
FIG. 3 is a simplified cross section along the XZ plane of the lithium ion secondary battery in FIG. 1.

FIG. 1 is a partially cut-away perspective view of the lithium ion secondary battery 100 pertaining to the first embodiment of the present invention. FIG. 2 is a YZ plane cross section of FIG. 1. FIG. 3 is a ZX plane cross section of the laminated structure 85, lead wire 22, and lead wire 12 in FIG. 1.

As shown in FIGS. 1 to 3, the lithium ion secondary battery 100 pertaining to this embodiment is made up mainly of the laminated structure 85, a case 50 that holds the laminated structure 85 in a sealed state, and the lead wire 22 and lead wire 12 for connecting the laminated structure 85 with the outside of the case 50.

As shown in FIGS. 2 and 3, the laminated structure 85 comprises a three-layer anode (negative electrode) 130, a separator 40, a three-layer cathode (positive electrode) 140, a separator 40, a three-layer anode (negative electrode) 130, a separator 40, a three-layer cathode (positive electrode) 140, a separator 40, and a three-layer anode (negative electrode) 130, laminated in that order from the top.

For the sake of convenience, the terms anode and cathode as used herein are determined using the polarity during discharge of the lithium ion secondary battery 100 as a reference. Since the direction of current flow during charging of the lithium ion secondary battery 100 is opposite that during discharge, the anode and cathode are switched.

Anode

The three-layer anode 130 has a negative electrode collector 15, and active material layers 10 formed on both sides of the negative electrode collector 15.

The three-layer anode 130 is laminated such that the active material layers 10 are each in contact with a separator 40.

There are no particular restrictions on the material of the negative electrode collector 15 as long as it is a metal material ordinarily used for the anode collectors of lithium ion secondary batteries, but examples include copper and nickel. As shown in FIGS. 1 and 3, a tongue 15a is formed at the end of the negative electrode collector 15 by extending each collector toward the outside.

Figure 4:
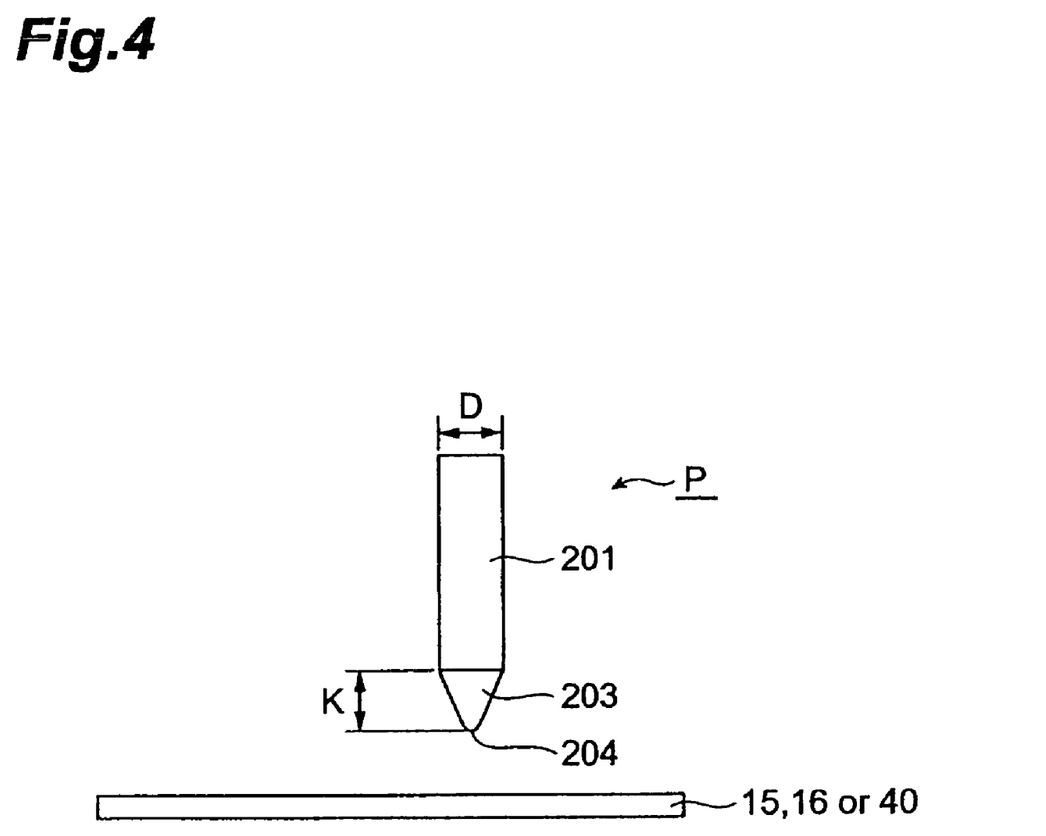
FIG. 4 is a schematic side view of the needle used in the puncture test of the separator and collector.

The puncture strength of the negative electrode collector 15 here is termed Tca. In this embodiment, as shown in FIG. 4, the puncture strength is the maximum load when a needle P punctures the test piece (such as the negative electrode collector 15) at a rate of 200 mm/min, using a needle in which a conical portion 203 with a height K of 2.6 mm is formed at the tip of a shaft 201 with a diameter D of 3 mm, and the radius of curvature of the tip 204 of this conical portion 203 is 40 μm.

The active material layers 10 contain a negative electrode active material, a conductive auxiliary agent, a binder, etc.

There are no particular restrictions on the negative electrode active material as long as it allows the occlusion and release of lithium ions, the insertion and desorption of lithium ions, or the doping and undoping of lithium ions and counter anions of the lithium ions (such as $ClO_4^-$) to be carried out reversibly, and the same materials as those used in conventional lithium ion secondary battery elements can be used. Examples include natural graphite, synthetic graphite, mesocarbon microbeads, mesocarbon fiber (MCF), coke, vitreous carbon, organic compound sinters, and other such carbon materials, metals that can be compounded with lithium, such as aluminum, silicon, and tin, amorphous compounds whose main component is an oxide, such as $SiO_2$ or $SnO_2$, and lithium titanate ($Li_4Ti_3O_{12}$).

Of the above, a carbon material is preferred. Particularly favorable is a carbon material whose interlayer distance $d_{002}$ is from 0.335 to 0.338 nm and in which the size $Lc_{002}$ of crystallites of the carbon material is from 30 to 120 nm. Using a material such as this allows the occlusion and release of lithium ions and the insertion and desorption of lithium ions to be carried out more efficiently. Examples of carbon materials that satisfy these conditions include synthetic graphite and MCF. The above-mentioned interlayer distance $d_{002}$ and crystallite size $Lc_{002}$ can be determined by X-ray diffraction.

In this embodiment, it is particularly favorable for the negative electrode active material to be carried by the active material layers 10 in an amount of 2.0 to 15.0 mg/cm². The carried amount referred to here is the weight of the negative electrode active material per unit of surface area of the negative electrode collector 15.

There are no particular restrictions on the conductive auxiliary agent as long as it will improve the electrical conductivity of the active material layers 10, and any known conductive auxiliary agent can be used. Examples include carbon black, carbon materials, copper, nickel, stainless steel, iron, and other metal micropowders, mixtures of carbon materials and metal micropowders, and conductive oxides such as ITO.

There are no particular restrictions on the binder as long it is able to bind particles of the negative electrode active material and particles of the conductive auxiliary agent to the negative electrode collector 15. Examples include polyvinylidene fluoride (PVDF), polytetrafluoroethylene (PTFE), tetrafluoroethylene-hexafluoropropylene copolymers (FEP), tetrafluoroethylene-perfluoroalkylvinyl ether copolymers (PEA), ethylene-tetrafluoroethylene copolymers (ETFE), polychlorotrifluoroethylene (PCTFE), ethylene-chlorotrifluoroethylene copolymers (ECTFE), polyvinyl fluoride (PVF), and other such fluororesins, and styrene-butadiene rubber (SBR).

Cathode

The three-layer cathode 140 has a positive electrode collector 16 and active material layers 20 formed on both sides of the positive electrode collector 16. The three-layer cathode 140 is laminated so that the active material layers 20 are each in contact with a separator 40.

There are no particular restrictions on the material of the positive electrode collector 16 as long as it is a metal material ordinarily used for the cathode collectors of lithium ion secondary batteries, but an example is aluminum. As shown in FIGS. 1 and 3, a tongue 16a is formed at the end of the positive electrode collector 16 by extending each collector toward the outside. The puncture strength of the positive electrode collector 16 is termed Tcc here.

The active material layers 20 contain a positive electrode active material, a conductive auxiliary agent, a binder, etc.

There are no particular restrictions on the positive electrode active material as long as it allows the occlusion and release of lithium ions, the insertion and desorption of lithium ions (intercalation), or the doping and undoping of lithium ions and counter anions of the lithium ions (such as $ClO_4^-$) to be carried out reversibly, and known electrode active materials can be used. Examples include lithium cobaltate ($LiCoO_2$), lithium nickelate ($LiNiO_2$), lithium manganese spinel ($LiMn_2O_4$), compound metal oxides expressed by the general formula $LiNi_xCo_yMn_zO_2$ (x+y+z=1), lithium vanadium compound ($LiV_2O_5$), olivine-type $LiMPO_4$ (where M is Co, Ni, Mn, or Fe), and lithium titanate ($Li_4Ti_5O_{12}$) and other such compound metal oxides.

The amount in which the positive electrode active material is carried per unit of surface area of the positive electrode collector 16 can be set as desired according to the amount in which the negative electrode active material is carried in the active material layers 10, but a range of 4.0 to 30.0 mg/cm$^2$, for example, is preferable.

The constituent elements other than the positive electrode active material contained in the active material layers 20 can be the same ones that make up the active material layers 10. Also, it is preferable if the active material layers 20 also contain the same electron conducting particles as the active material layers 10.

Separator

The separators 40 disposed between the active material layers 10 and the active material layers 20 are formed from a porous, electrically insulating material. There are no particular restrictions on the material of the separator, and any known separator material can be used. Examples of porous, electrically insulating materials include single-layer films composed of polyethylene, polypropylene, or a polyolefin, laminates of such films, drawn films of mixtures of the above resins, and fiber nonwoven cloth composed of one or more kinds of material selected from the group consisting of cellulose, polyester, and polypropylene.

As shown in FIG. 3, the laminated structure 85 is such that the surface area of the separator 40, the active material layers 10 (that is, the three-layer anode 130), and the active material layers 20 (that is, the three-layer cathode 140) decreases in that order when viewed in plan view. The end faces of the active material layers 10 stick out farther than the end faces of the active material layers 20, and the end faces of the separators 40 stick out farther than the end faces of the active material layers 10.

As a result, even if manufacturing error or the like should result in a certain amount of positional misalignment in the direction perpendicular to the direction in which the layers are laminated, it is still easy for the entire face of the active material layers 20 to oppose the active material layers 10 in the laminated structure 85. Therefore, lithium ions released from the active material layers 20 are sufficiently taken into the active material layers 10 through the separators 40. If the lithium ions are not sufficiently taken into the active material layers 10, those lithium ions that were not taken into the active material layers 10 deposit, which reduces the carriers of electrical energy, so there may be a decrease in the energy capacity of the cell. Furthermore, since the separators 40 are larger than the active material layers 20 and the active material layers 10, and stick out from the end faces of the active material layers 20 and active material layers 10, short circuiting caused by contact between the active material layers 20 and the active material layers 10 is reduced.

With this embodiment, the voidage of the separators 40 can be from 45 to 90%, for example. The "voidage" referred to here is the quotient of dividing the volume of the void portion of the separator by the volume obtained by adding together the void and solid portions of the separator. This voidage can be measured by a weight method, for example.

We will let Ts be the puncture strength of the separator 40. In this embodiment, either Ts≧4Tcc or Ts≧4Tca or both are satisfied. As mentioned above, Tca is the puncture strength of the negative electrode collector 15, and Tcc is the puncture strength of the positive electrode collector 16. It is preferable if Tca≦0.5 N and Ts≧1.5 N, or if Tcc≦0.5 N and Ts≧1.5 N.

The puncture strength of the collectors and separators will vary with the material, thickness, whether a surface treatment (such as etching) has been performed, and other such factors, so separators and collectors of various puncture strengths can be easily obtained.

The puncture strength of the separators and collectors here was measured with the needle described above. The needle used in this embodiment has a tip that is considerable sharper than the needles that have been used up to now to measure puncture strength (which had a tip with a radius of curvature of 500 μm, for example). When the needle pertaining to this embodiment is used, the separators and collectors exhibit better behavior during a puncture test, such as a tendency to elongate or break.

Electrolytic Solution

An electrolytic solution is contained in the active material layers 10, the active material layers 20, and the separators 40. There are no particular restrictions on the electrolytic solution, and any electrolytic solution (an electrolytic aqueous solution or an electrolytic solution using an organic solvent) that contains a lithium salt and has been used in known lithium ion secondary battery elements can be used. However, since voltage resistance during charging will be kept low if the electrolytic aqueous solution has a low electrochemical decomposition voltage, it is preferable to use an electrolytic solution using an organic solvent (nonaqueous electrolytic solution). A lithium salt dissolved in a nonaqueous solvent (organic solvent) can be used favorably as the electrolytic solution of a secondary battery element. Examples of lithium salts include $LiPF_6$, $LiClO_4$, $LiBF_4$, $LiAsF_6$ $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, LiBOB, and other such salts. These salts may be used as a single type, or two or more types may be used together.

Any solvent used in known secondary battery elements can be used as an organic solvent. Preferred examples include propylene carbonate, ethylene carbonate, and diethyl carbonate. These may be used singly, or two or more may be mixed in the desired proportions. Since the solvent composition can affect safety greatly, safety concerns had to be taken into account in the selection of the solvent composition in the past. With the present invention, however, since almost no heat is generated in a battery during a puncture test, the solvent composition can be selected from a broader range, and all solvent compositions can be considered.

In this embodiment, the electrolytic solution need not be liquid, and may instead be a gelled electrolyte obtained by adding a gelling agent. Also, a solid electrolyte (a solid polymer electrolyte or an electrolyte composed of an ion conductive inorganic material) may be contained instead of an electrolytic solution.

Lead Wires

As shown in FIG. 1, the lead wire 22 and the lead wire 12 have a ribbon-like appearance and stick out from the case 50 through a sealed portion 50b.

The lead wire 22 is formed from a metal or other conductor material. Aluminum or the like can be used as this conductor material, for example. As shown in FIG. 3, the end of the lead wire 22 inside the case 50 is joined by resistance welding or the like to the tongues 16a of the positive electrode collectors 16, and the lead wire 22 is electrically connected to the active material layers 20 via the positive electrode collectors 16.

Meanwhile, the lead wire 12 is also formed from a metal or other conductor material. Copper, nickel, or another such conductive material can be used as this conductor material. The end of the lead wire 12 inside the case 50 is welded to the tongues 15a of the negative electrode collectors 15, and the lead wire 12 is electrically connected to the active material layers 10 via the negative electrode collectors 15.

As shown in FIGS. 1 and 3, the portions of the lead wires 22 and 12 sandwiched in the sealed portion 50b of the case 50 are covered by a resin or other such insulator 14 in order to improve the seal. There are no particular restrictions on the material of the insulators 14, but they are preferably formed from a synthetic resin, for example. The lead wire 22 and the lead wire 12 are separated in the direction perpendicular to the lamination direction of the laminated structure 85.

Case

There are no particular restrictions on the case 50 as long as it seals the laminated structure 85 and prevents air and moisture from getting into the interior of the case, and any case that has been used in known secondary battery elements can be used. For instance, it can be made from an epoxy resin or other such synthetic resin, or an aluminum or other metal sheet can be laminated with a resin. As shown in FIG. 1, the case 50 is formed by folding a flexible, rectangular sheet 51C in two at a point substantially in the middle in the lengthwise direction, and sandwiches the laminated structure 85 from both sides in the lamination direction (vertical direction). Of the ends of the sheet 51C that has been folded in two, the sealed portions 50b on the three sides excluding the folded portion 50a are heat sealed or bonded with an adhesive so that the laminated structure 85 is sealed on the inside. Also, the case 50 is bonded to the insulators 14 at the sealed portions 50b to seal the lead wires 22 and 12.

With this lithium ion secondary battery 100, heat generation in the battery is sufficiently suppressed during a puncture test. Therefore, the safety of the lithium ion secondary battery is further enhanced.

The reason the lithium ion secondary battery of this embodiment exhibits these characteristics is not entirely clear, but the following mechanism is a possibility. First, when a needle passes through a laminate with a structure of negative electrode/separator/positive electrode, one possible source of heat generation in this puncture test is that the collector of one of the electrodes becomes wrapped around the needle around the hole, protrudes through the hole in the separator, and comes into contact with the collector of the adjacent electrode.

Figure 5:
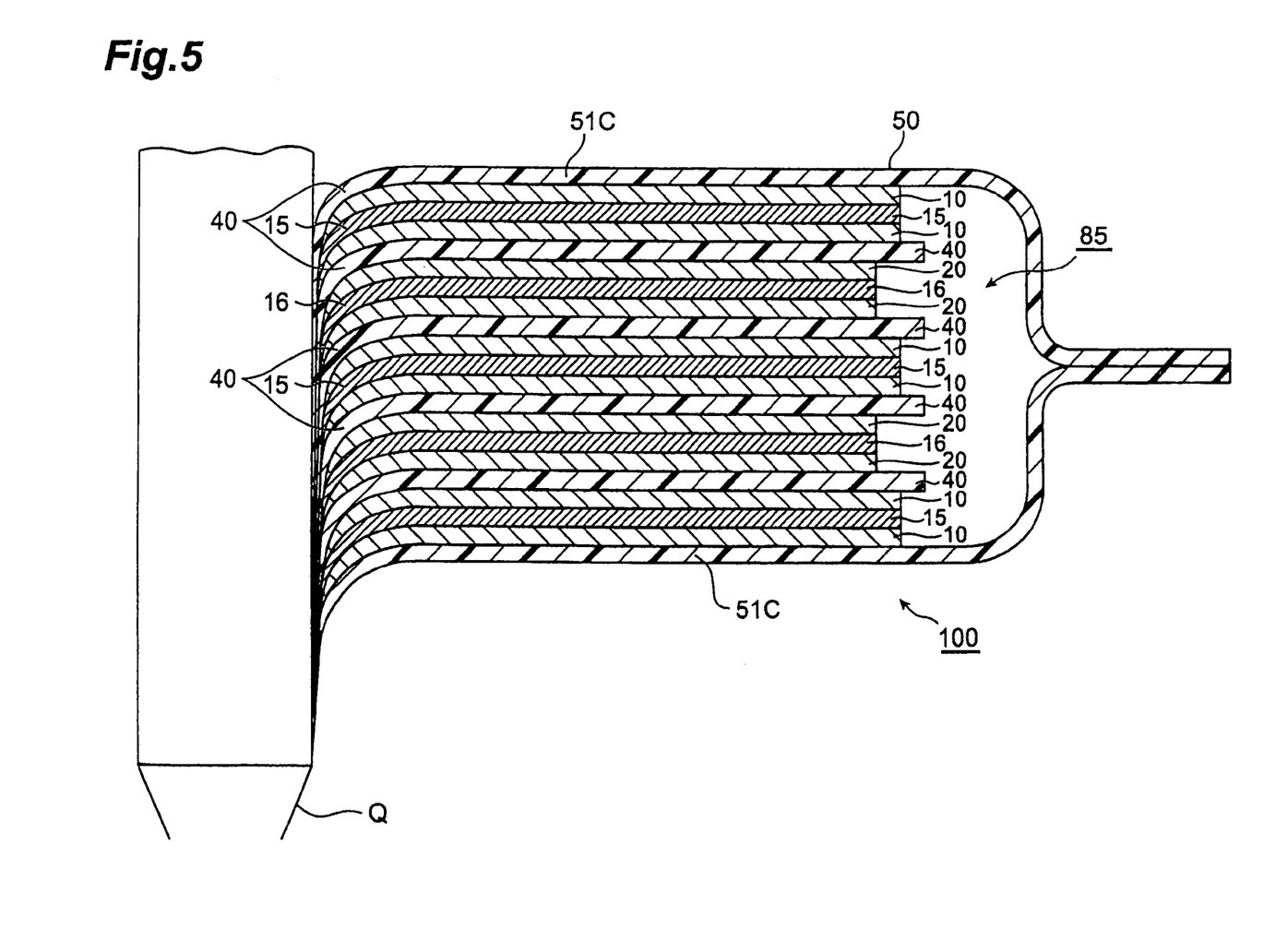
FIG. 5 is a simplified cross section illustrating the state when the lithium ion secondary battery of FIG. 1 has been punctured with a needle.

With this embodiment, however, the puncture strength Ts of the separator is at least four times higher than the puncture strength of the collector of one of the electrodes, that is, higher than the puncture strength Tcc of the positive electrode collector 16 or the puncture strength Tca of the negative electrode collector 15. Therefore, as shown in FIG. 5, when a needle Q is stuck through the laminated structure 85, the separator 40 stretches out better than the collector 15 or 16 of said one electrode, and the separators 40 tend to overlap each other, whereas the collector 15 or 16 of said one electrode tends to break and not to stretch, so it is blocked by the separator 40 and tends not to come into contact with the collector 15 or 16 of the adjacent electrode.

The puncture strength Ts of the separator need only be specified with respect to the puncture strength Tcc or Tca of the collector of one of the electrodes, and not with respect to the puncture strength of the collector of the other electrode. The reason for this seems to be that if it is difficult for the collector of one electrode to come into contact with the adjacent electrode by means of the separator, then no matter how much the collector of the other electrode stretches, it will still have a difficult time coming into contact with the collector of the first electrode. It should go without saying that both $Ts \geqq 4Tcc$ and $Ts \geqq 4Tca$ may be satisfied.

It is preferable here if $Tcc \leqq 0.5$ N and $Ts \geqq 1.5$ N, or if $Tca \leqq 0.5N$ and $Ts \geqq 1.5$ N. Satisfying these conditions will further suppress heat generation during a puncture test.

It is also preferable if the collector of the electrode serving as the reference for the puncture strength of the separator 40 is an aluminum foil. Because aluminum foil has a tendency to stretch easily, heat generation during a needle puncture test can be suppressed by satisfying the above requirements.

Furthermore, if the laminated structure 85 has a structure of a three-layer anode (negative electrode) 130/a separator/a three-layer cathode (positive electrode) 140/a separator/and a three-layer anode (negative electrode), that is if the outermost layer on both sides if a negative electrode, this will tend to further suppress heat generation during a puncture test. This effect is obtained as long as the laminated structure 85 has a structure in which negative electrode/separator/(positive electrode/ separator/negative electrode)$_n$ (where n is an integer of at least 1).

Also, if three-layer anodes (negative electrodes) having active material layers 10 on both sides of a collector 15 are employed as the outermost layers, the anodes 130 will be resistant to warping even after repeated charge and discharge cycling. In this case, since only one type of anode (negative electrode) will be needed, that is, since a two-layer anode comprising an active material layer formed on just one side of a collector need not be produced for the anodes (negative electrodes) of the outermost layers, the manufacturing cost will be lower.

Manufacturing Method

An example of a method for producing the above-mentioned lithium ion secondary battery 100 will now be described.

First, a separator, positive electrode collector, and negative electrode collector that satisfy the above relationships are readied. Then, coating liquids (slurries) containing the constituent materials for forming the electrode layers serving as the active material layers 10 and the active material layers 20 are prepared for each. The anode coating liquid is a solution containing the above-mentioned negative electrode active material, conductive auxiliary agent, binder, etc., and the cathode coating liquid is a solution containing the above-mentioned positive electrode active material, conductive auxiliary agent, binder, etc. There are no particular restrictions on the solvent used in the coating liquid as long as it is capable of dissolving the binder and capable of dispersing the active material and conductive auxiliary agent, but examples include N-methyl-2-pyrrolidone and N,N-dimethylformamide.

Figure 6:
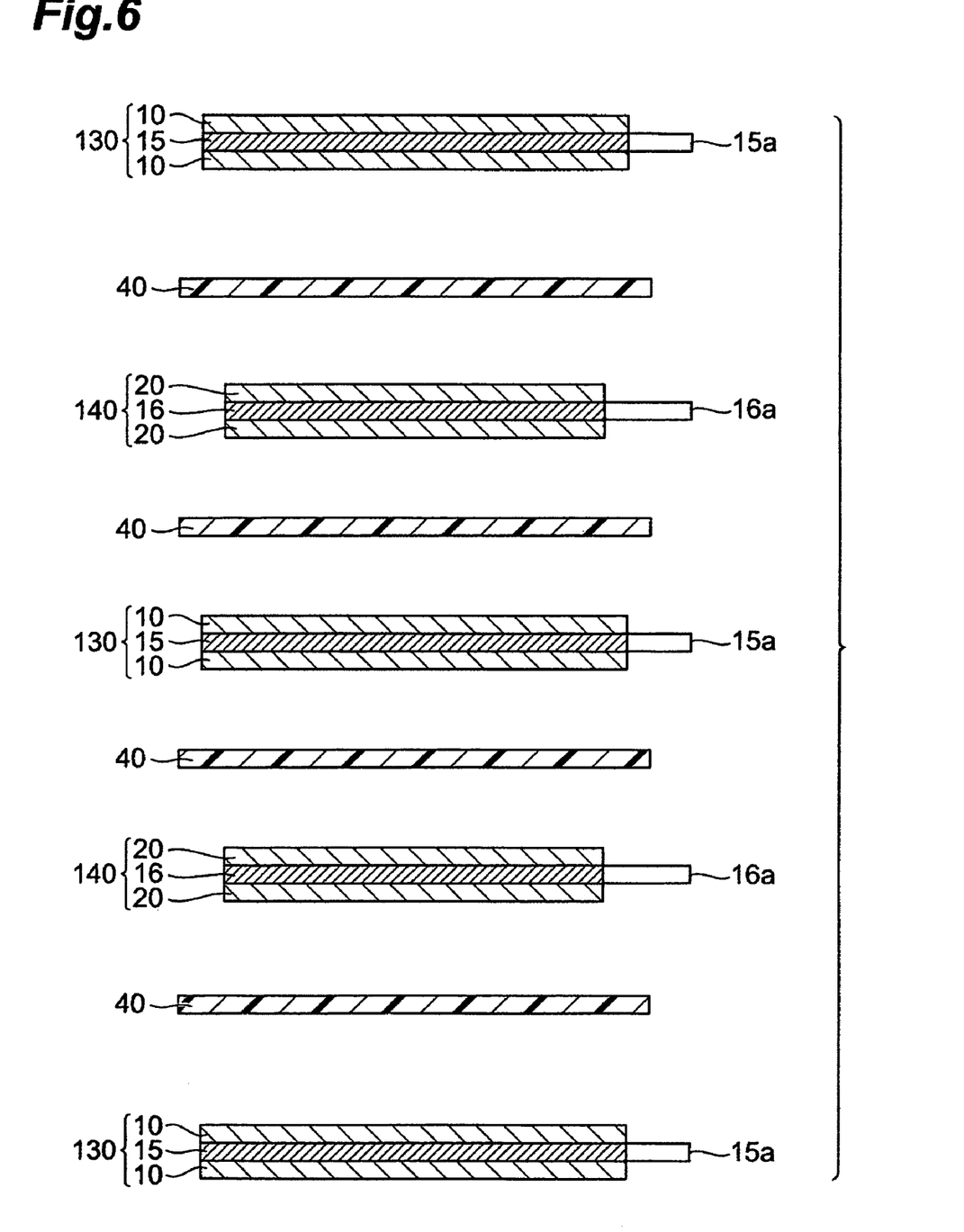
FIG. 6 is a simplified cross section illustrating the process of producing the lithium ion secondary battery of FIG. 1.

As shown in FIG. 6, both sides of the negative electrode collector 15 are then coated with the anode coating liquid, the coating is dried to form the active material layers 10, and this product is cut into a rectangular shape having the tongue 15a, to obtain three of the three-layer anodes 130.

Similarly, both sides of the positive electrode collector 16 are coated with the cathode coating liquid, the coating is dried to form the active material layers 20, and this product is cut into a rectangular shape having the tongue 16a, to obtain two of the three-layer cathodes 140.

There are no particular restrictions on the method for coating the collector with the coating liquid, and the method can be suitably selected as dictated by the material and shape of the metal plate used for the collector and other such factors, but examples include metal mask printing, electrostatic coating, dip coating, spray coating, roll coating, doctor blade coating, gravure coating, and screen printing. After coating, a rolling treatment such as lithographic pressing or calender rolling is performed as needed.

The three-layer anodes 130 and three-layer cathodes 140 are then laminated so as to sandwich the separators 40 between them in the order shown in FIG. 6, namely, three-layer anode 130/separator 40/three-layer cathode 140/separator 40/three-layer anode 130/separator 40/three-layer cathode 140/separator 40/three-layer anode 130, to obtain the laminated structure 85 shown in FIG. 3. Here, as shown in FIG. 6, the active material layers 20 are disposed so as to be in contact with one side of each of the separators 40, and the active material layers 10 with the other side.

The lead wires 22 and 12 shown in FIG. 3 are then readied, and the middle parts in the lengthwise direction are covered with the insulator 14 comprising a resin or the like. Then, as shown in FIG. 3, the tongues 16a and the end of the lead wire 22 are welded, and the tongues 15a and the lead wire 12 are also welded. This completes the laminated structure 85 to which the lead wire 22 and the lead wire 12 are connected.

Next, a pouch-shaped case 50 is prepared from a sheet to which aluminum has been laminated with a hot-bondable resin layer. The laminated structure 85 is inserted through the open end, an electrolytic solution is injected into the case 50 in a vacuum vessel, and the laminated structure 85 is impregnated with the electrolytic solution. After this, part of the lead wire 22 and the lead wire 12 is allowed to stick out from the inside of the case 50 while the opening 50c of the case 50 is sealed with a heat sealing machine. This completes the production of the lithium ion secondary battery 100.

The present invention is not limited to the above embodiment, and various modification aspects are also possible.

For instance, in the above embodiment, the laminated structure 85 had four combinations of secondary battery elements, namely, an anode/a separator/a cathode, as the single battery, but may have more than four, or may have three or fewer, such as one.

Figure 7:
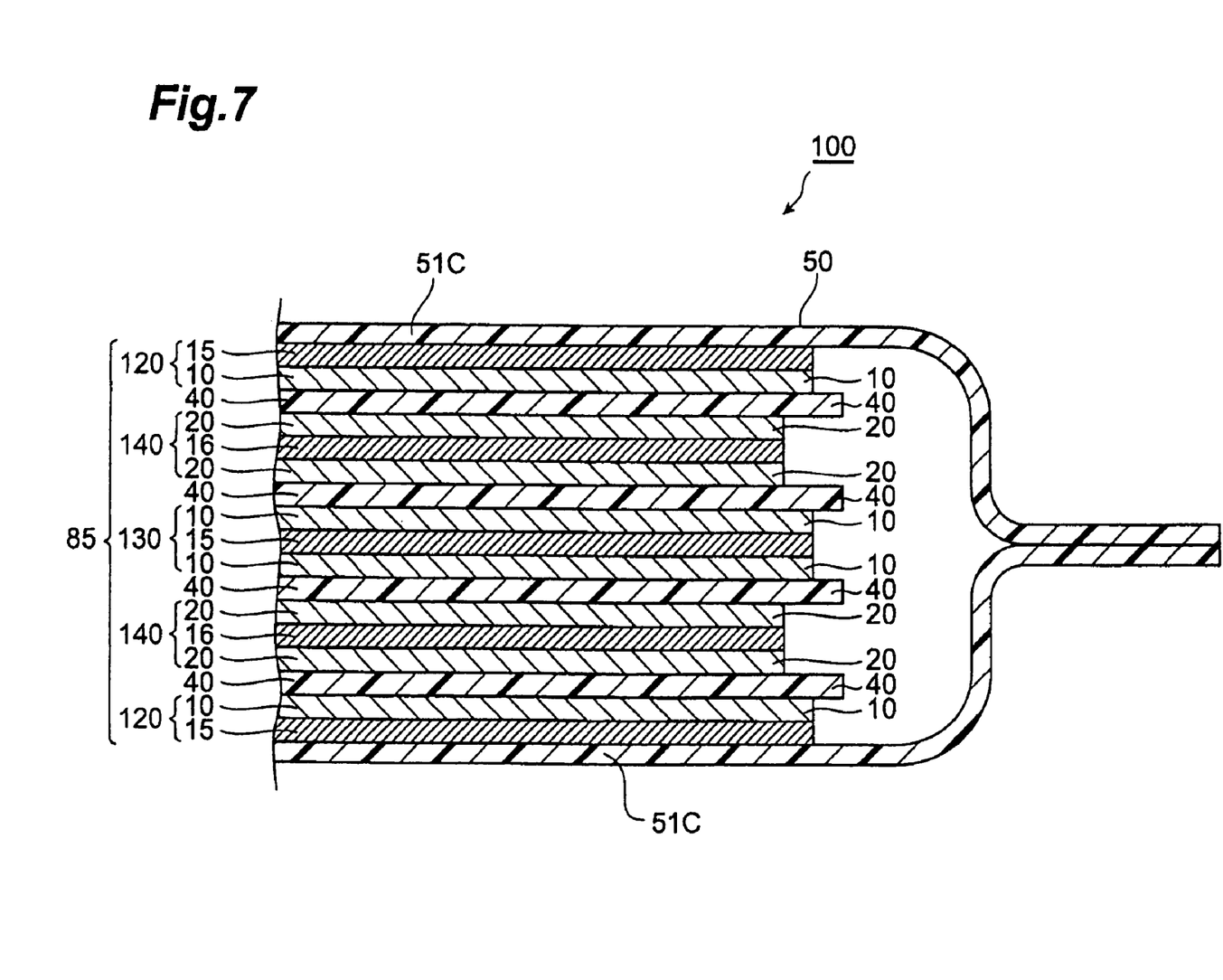
FIG. 7 is a simplified cross section along the YZ plane of the lithium ion secondary battery pertaining to a modification example.

Also, a configuration in which both of the outermost layers consisted of the three-layer anode 130 was given as a preferred configuration example in the above embodiment, but one or both of the two outermost layers can instead be a two-layer anode. FIG. 7 shows a case in which both of the two outermost layers consist of a two-layer anode 120. The two-layer anode 120 comprises an active material layer 10 formed on just one side of the negative electrode collector 15.

Also, a configuration in which both of the outermost layers consisted of anodes (negative electrodes) was given as a preferred configuration example in the above embodiment, but the present invention can also be worked by having the two outermost layers consist of a cathode (positive electrode) and an anode (negative electrode), or of a cathode (positive electrode) and a cathode (positive electrode).

EXAMPLES

The present invention will now be described in further detail by giving working examples and comparative examples, but the present invention is not limited in any way to these working examples.

Positive electrode collectors and separators having various puncture strengths were readied, and these were combined to produce lithium ion secondary batteries.

Example 1

First, a cathode laminate was produced by the following procedure. First, $LiMn_{0.33}Ni_{0.33}Co_{0.34}O_2$ (subscript numbers indicate the atomic ratio) (as a positive electrode active material), acetylene black (as a conductive auxiliary agent), and polyvinylidene fluoride (PVDF) (as a binder) were readied, and these were mixed and dispersed in a planetary mixer so that their weight ratio would be 90:6:4 (positive electrode active material: conductive auxiliary agent: binder). After this, a suitable amount of NMP was mixed in as a solvent to adjust the viscosity and prepare a cathode coating liquid in the form of a slurry.

Next, a plain aluminum foil (thickness of 10 μm, puncture strength of 0.22 N) that had not undergone a surface treatment was readied, this aluminum foil was coated on both sides with a cathode coating liquid by doctor blade so that the amount of active material carried would be 5.5 mg/cm², and the coating was dried. This product was then pressed with a calender roll so that the voidage of the applied active material layer would be 28%, and this product was punched out to a shape having a specific tongue-shaped terminal and a size of 23×19 mm on the cathode side to produce a three-layer cathode.

An anode laminate was then produced by the following procedure. First, natural graphite (as a negative electrode active material) and PVdF (as a binder) were readied, and these were mixed and dispersed in a planetary mixer so that their weight ratio would be 95:5 (negative electrode active material: binder), after which a suitable amount of NMP was mixed in as a solvent to adjust the viscosity and prepare an anode coating liquid in the form of a slurry.

Next, a plain copper foil (thickness of 17 μm) that had not undergone a surface treatment was readied, this copper foil was coated on both sides with an anode coating liquid by doctor blade so that the amount of active material carried would be 3.0 mg/cm², and the coating was dried. This product was then pressed with a calender roll so that the voidage of the anode layer would be 30%, and this product was punched out to a shape having a specific tongue-shaped terminal and a size of 23 ×19 mm on the anode side, to produce a three-layer anode.

Next, a single-layer, porous polyethylene film (thickness of 12 μm, puncture strength of 1.27 N) was punched out to a size of 24×20 mm to create a separator.

The three-layer anode and the three-layer cathode were then laminated so as to sandwich the separator in between, a laminated structure was created having 14 layers of secondary battery elements, and this was fixed by hot compression bonding from both end faces. The three-layer anodes were disposed as the outermost layers of the laminated structure.

A nonaqueous electrolytic solution was then prepared as follows. Propylene carbonate (PC), ethylene carbonate (EC), and diethyl carbonate (DEC) were mixed in a volumetric ratio of 2:1:7, respectively, and used as a solvent. $LiPF_6$ was then dissolved in the solvent in a concentration of 1.5 mol/dm³. 1,3-propane sultone was then added in an amount of 3 weight parts per 100 weight parts solvent to prepare a nonaqueous electrolytic solution.

An aluminum laminated film was then shaped into a pouch to prepare a case, into which the laminated structure was inserted. The nonaqueous electrolytic solution was injected in a vacuum tank to impregnate the laminated structure with the nonaqueous electrolytic solution. After this, while the pressure was still reduced, the open end of the case was sealed with part of the tongue-like terminals sticking out from the case, and initial charging and discharging were performed to obtain a laminated lithium ion secondary battery with a capacity of 45 mAh.

The lithium ion secondary battery thus obtained was subjected to a puncture test. In this puncture test, a steel needle with a length of 50 mm, a diameter of 1.5 mm, and a radius of curvature at the tip of 40 μm was punched substantially vertically with a constant-speed press into the approximate center of the laminated structure. Any rise in temperature after puncture was recorded with a thermocouple in contact with the battery, and the maximum temperature was measured. The voltage between terminals was also measured immediately after puncture.

Example 2

Everything was carried out in the same manner as in Example 1, except that a single-layer, porous polyethylene film with a thickness of 18 μm and puncture strength of 1.67 N was used as the separator.

Example 3

Everything was carried out in the same manner as in Example 1, except that a two-layer, porous polyethylene film with a thickness of 25 μm and a puncture strength of 2.35 N was used as the separator.

Example 4

Everything was carried out in the same manner as in Example 1, except that a single-layer, porous polyethylene film with a thickness of 27 μm and a puncture strength of 2.65 N was used as the separator.

Example 5

Everything was carried out in the same manner as in Example 1, except that a single-layer, porous polyethylene film with a thickness of 27 μm and a puncture strength of 2.94 N was used as the separator.

Example 6

Everything was carried out in the same manner as in Example 4, except that an plain aluminum foil with a thickness of 17 μm and a puncture strength of 0.59 N and that had not undergone a surface treatment was used as the positive electrode collector.

Example 7

Everything was carried out in the same manner as in Example 1, except that an plain aluminum foil with a thickness of 12 μm and a puncture strength of 0.29 N and that had not undergone a surface treatment was used as the positive electrode collector, and a single-layer porous polyethylene film with a thickness of 16 μm and a puncture strength of 1.37N was used as the separator.

Example 8

Everything was carried out in the same manner as in Example 7, except that a single-layer, porous polyethylene film with a thickness of 16 μm and a puncture strength of 1.76 N was used as the separator.

Example 9

Everything was carried out in the same manner as in Example 7, except that a single-layer, porous polyethylene film with a thickness of 20 μm and a puncture strength of 1.96 N was used as the separator.

Example 10

Everything was carried out in the same manner as in Example 7, except that a single-layer, porous polyethylene film with a thickness of 16 μm and a puncture strength of 2.16 N was used as the separator.

Comparative Example 1

Everything was carried out in the same manner as in Example 1, except that a two-layer, porous polyethylene film with a thickness of 18 μm and puncture strength of 0.69 N was used as the separator.

Comparative Example 2

Everything was carried out in the same manner as in Comparative Example 1, except that an plain aluminum foil with a thickness of 20 μm and a puncture strength of 0.81 N and that had not undergone a surface treatment was used as the positive electrode collector.

Comparative Example 3

Everything was carried out in the same manner as in Comparative Example 1, except that an aluminum foil with a thickness of 40 μm and a puncture strength of 1.67 N and whose surface had been etched was used as the positive electrode collector.

Comparative Example 4

Everything was carried out in the same manner as in Example 3, except that an aluminum foil with a thickness of 20 μm and a puncture strength of 0.81 N and whose surface had not been etched was used as the positive electrode collector.

Comparative Example 5

Everything was carried out in the same manner as in Example 3, except that an aluminum foil with a thickness of 40 μm and a puncture strength of 1.67 N and whose surface had been etched was used as the positive electrode collector.

Comparative Example 6

Everything was carried out in the same manner as in Comparative Example 1, except that an aluminum plain foil with a thickness of 17 μm and a puncture strength of 0.59 N and whose surface had not undergone a surface treatment was used as the positive electrode collector, and a single-layer porous polyethylene film with a thickness of 20 μm and puncture strength of 1.96 N was used as the separator.

Comparative Example 7

Everything was carried out in the same manner as in Example 7, except that a single-layer porous polyethylene film with a thickness of 9 μm and puncture strength of 0.98 N was used as the separator.

Figure 9:
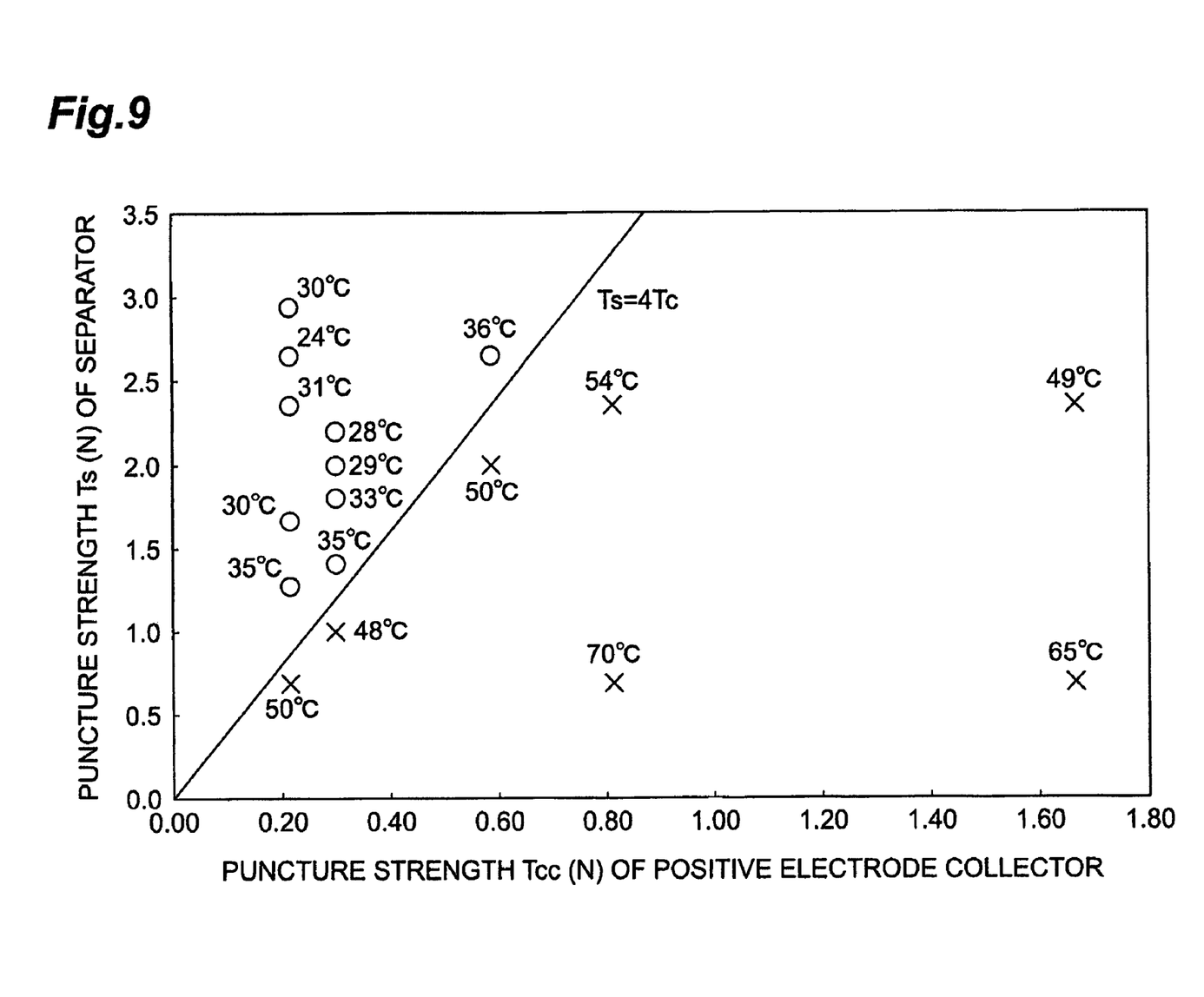
FIG. 9 is a graph of the puncture strength Tcc of the positive electrode collector and the puncture strength Ts of the separator in Working Examples 1 to 10 and Comparative Examples 1 to 7.

FIG. 8 shows the voltage between terminals immediately after a puncture test, and the maximum attained temperature after the puncture test, for these lithium ion secondary batteries. FIG. 9 is a graph of the puncture strength Tcc of the positive electrode collector and the puncture strength Ts of the separator. In this graph, the O symbols correspond to Examples 1 to 10, while the X symbols correspond to Comparative Examples 1 to 7. The numbers next to the symbols indicate the maximum attained temperature of the battery.

With Examples 1 to 10, in which $Ts \geq 4Tc$ was satisfied, the maximum attained temperature was under 40° C. With Comparative Examples 1 to 7, however, in which the above condition was not satisfied, the temperature rose considerably.

The separator of Example 1, the separator of Example 3, and the separator of Comparative Example 1 had a puncture strength of 4.21 N, 3.92 N, and 3.04 N, respectively, as measured with a needle having a radius of curvature at the tip of 1 mm. It was found that these values have little correlation to the puncture strength measured with the needle used in these working examples, and that they are unfavorable for evaluating the suppression of heat generation in a puncture test

What is claimed is:

1. A lithium ion secondary battery, comprising:
    a positive electrode;
    a negative electrode; and
    a separator provided between the positive electrode and the negative electrode,
    the positive electrode and the negative electrode each having a collector and an active material layer provided over the collector, and
    a relationship $Ts \geq 4Tc$ being satisfied, where Ts is a puncture strength of the separator, and Tc is a puncture strength of the collector of the positive electrode and/or the negative electrode,
    the puncture strength being a maximum load when a needle punctures a test piece at a rate of 200 mm/min, using a needle in which a conical portion with a height of 2.6mm is formed at a tip of a shaft with a diameter of 3 mm, where a radius of curvature of the tip of the conical portion is 40 μm.

2. The lithium ion secondary battery according to claim 1, wherein $Tc \leq 0.5$ N and Ts 1.5 N.

3. The lithium ion secondary battery according to claim 1, wherein the collector of the positive electrode and/or the negative electrode is an aluminum foil.

4. The lithium ion secondary battery according to claim 1, having a laminated structure of the negative electrode/the separator/(the positive electrode/the separator/the negative electrode)$_n$ (where n is a repeat number, and is an integer of at least 1).

5. The lithium ion secondary battery according to claim 4, wherein each of the negative electrodes has the active material layer on both sides of the collector.

* * * * *